United States Patent
Deerman et al.

(10) Patent No.: US 9,401,932 B2
(45) Date of Patent: Jul. 26, 2016

(54) DEVICE AND METHOD FOR DETECTION OF ANOMALOUS BEHAVIOR IN A COMPUTER NETWORK

(71) Applicant: Cyber adAPT, Inc., Half Moon Bay, CA (US)

(72) Inventors: James Deerman, Lucas, TX (US); Bill Joll, Irvine, CA (US); Craig Lanning, N. Charleston, SC (US); Keith Rhodes, Gross Pointe, MI (US)

(73) Assignee: CYBER ADAPT, INC., Half Moon Bay, CA (US)

( * ) Notice: Subject to any disclaimer, the term of this patent is extended or adjusted under 35 U.S.C. 154(b) by 100 days.

(21) Appl. No.: 14/147,105

(22) Filed: Jan. 3, 2014

(65) Prior Publication Data

US 2014/0245374 A1    Aug. 28, 2014

Related U.S. Application Data

(63) Continuation-in-part of application No. 13/693,266, filed on Dec. 4, 2012, now Pat. No. 9,309,768.

(60) Provisional application No. 61/766,476, filed on Feb. 19, 2013.

(51) Int. Cl.
| H04L 9/00 | (2006.01) |
| H04L 29/06 | (2006.01) |
| F01D 3/04 | (2006.01) |

(52) U.S. Cl.
CPC ...... *H04L 63/20* (2013.01); *F01D 3/04* (2013.01); *H04L 63/14* (2013.01)

(58) Field of Classification Search
CPC combination set(s) only.
See application file for complete search history.

(56) References Cited

U.S. PATENT DOCUMENTS

| 8,321,938 | B2 * | 11/2012 | Strayer | H04L 63/1408 726/1 |
| 8,607,353 | B2 * | 12/2013 | Rippert, Jr. | G06Q 10/10 705/53 |
| 8,779,921 | B1 * | 7/2014 | Curtiss | 340/541 |
| 9,008,080 | B1 * | 4/2015 | Mehta | H04L 49/60 370/327 |
| 9,165,454 | B2 * | 10/2015 | Inagaki | G08B 23/00 |

* cited by examiner

*Primary Examiner* — Beemnet Dada

(57) ABSTRACT

A device and method for providing forensic data in network activity indicative of the presence of malware. A distributed set of network-based sensors operates within an enterprise network in cooperation with a centralized analytics and correlation engine that correlates detected events across the sensors to detect malicious activity on a monitored network which may include using a multi-tiered or Rete net rule set or engine. When malicious activity is detected upon the satisfaction of a predetermined set of conditions, the invention traces the activity to a host responsible for the activity for further action.

24 Claims, 6 Drawing Sheets

| Fig. 3A |
| Fig. 3B |

DEVICE AND METHOD FOR DETECTION OF ANOMALOUS BEHAVIOR IN A COMPUTER NETWORK

CROSS-REFERENCE TO RELATED APPLICATIONS

This application claims priority to U.S. Provisional Patent Application No. 61/766,476, entitled "Device and Method for Detection of Anomalous Behavior in a Computer Network", pursuant to 35 USC 119, which application was filed on Feb. 19, 2013 and is incorporated fully herein by reference.

This application is a continuation-in-part application of U.S. patent application Ser. No. 13/693,226 entitled "Cyber Behavior Analysis and Detection Method, System and Architecture" filed on Dec. 4, 2012, which application is incorporated fully herein by reference.

STATEMENT REGARDING FEDERALLY SPONSORED RESEARCH AND DEVELOPMENT

NA

BACKGROUND OF THE INVENTION

1. Field of the Invention

The invention relates generally to the field of computer malware activity detection on a computer on a computer network. More specifically, the invention relates to one or a distributed set of network-based sensors operating in cooperation with a centralized analytics and correlation engine that can correlate events across the sensors to detect malicious activity on a monitored network using a multi-tiered network conditions and statistics rule set. When malicious activity is detected upon the satisfaction of a predetermined set of network conditions or statistics, the invention traces the activity to a host computer or computers that may responsible for the activity for further analysis and action by a network administrator.

2. Description of the Related Art

With the onset of modern cyber-attacks on high profile and high value IT targets, it is apparent the state of prior art information security methods and devices is lacking. With computers and personal computing devices becoming increasingly network-oriented, the strategies and behaviors of modern malware have adapted and evolved to focus their attacks on these interconnected networked systems.

By way of background, a discussion of certain current malware tactics and of the shortfall of the older "defense-in-depth" security implementations used to prevent and detect these tactics follows and discusses aspects of the invention for addressing advanced malware in highly networked environments. The device and methods of the invention greatly enhances the security posture of networked computer systems and enables detection of evolving malware tactics now and in the future.

Malware has been around since at least the days of the "Morris worm" detected on about Nov. 2, 1988. Even before Morris' famous Internet worm, the ARPANET had the "Bob Thomas' Creeper" program. Creeper quickly proliferated through ARPANET, infecting everything in its path and thus the first computer virus was born. At that time, hackers were developing new ways of infecting computers and damaging computer communication.

In that period, malware was merely a set of opportunistic attacks for fame and glory through high-profile nuisance attacks. Unfortunately, malware evolved and eventually was used for theft or destruction of sensitive or proprietary information and other illicit activities.

With the onset of computer networking and the "connected" PC, a greater number of potential hacker targets emerged and a highly-connected delivery mechanism was emerging called the Internet.

In about 2007, the first "botnets" began to appear. Botnets fundamentally changed the way malware could be used and brought an onset of new information security devices and procedures intended to stop or mitigate the effects of this new form of malware. Nonetheless, malware continued to evolve into targeted attacks that were used for industrial espionage, specific targeted theft, publicity attacks, and personal attacks such as revenge and spying.

Malware has continued to evolve to a point today that current informational security safeguards are limited against the onslaught of "advanced malware", particularly, what is known as the Advanced Persistence Threat or "APT" which has moved into the mobile computing world, affecting laptop computers, smart phones, tablets and other mobile devices.

What is considered as "Advanced Malware" in the disclosure herein is defined as the plurality of malicious network attacks called by various names such as Targeted Cyber Attacks, Zero-day, Crimeware, Cyber Warfare, and Advanced Persistent Threats among other names. These types of cyber-attacks are sophisticated, targeted and in many instances, use professionally-developed cutting-edge technology. These attacks may be carried out by well-financed nation-states, organized crime, and even other corporations against their competitors.

Advanced malware is typified by the malware commonly known as Advance Persistent Threats (APT) above. APTs are highly sophisticated and use technology for which there are currently few or no defensive capabilities. APTs usually start with high levels of reconnaissance by the hacker intended lead to the ability to provide long-term infiltration (Advanced) opportunities to exploit vulnerabilities in a targeted system.

A primary goal of an APT is to minimize the risk of detection for long periods of time, allowing the APT ample time to provide stealthy, long-term access to the now-compromised network (Persistent). APTs are also designed to permit well-trained and disciplined human attackers to direct the operations of the malware infecting the compromised systems using a command and control structure ("$C^2$") that has been surreptitiously installed into infected host or network. This permits the human attacker ample time and opportunity to carry out a focused attack (Threat).

APTs have been defined as "Tier III" attacks in the Air Force's 2007 "Victory in Cyberspace" report. This report defined as "Tier III" attack as one where the attacker has NSA-like capabilities and nation-state resources behind them. The level of sophistication or an APT defines an attack that make conventional prior art network security controls virtually ineffective.

APTs can be used not only to attack nation-state informational networks but also can be used to attack critical infrastructure networks and Industrial Control Systems (ICS) in the form of a supervisory control and data acquisition cyber-attack or "SCADA" cyber-attack, which form of attack the instant invention can be configured to address.

An example of an APT being used against a private sector enterprise was referred to as Operation Aurora, and was carried out against a number of high-tech commercial companies worldwide. Certain of the companies targeted were high-profile entities such as Symantec, Juniper, Google and Adobe.

Along with the above "conventional" information network attacks, a further example of an APT used against Industrial Control Systems (ICS) in a SCADA cyber-attack was the Symantec, worm; an ICS APT used against Iran to disable centrifuge operations in uranium enrichment activities. Newer variants of APT's are showing up daily. Duqu and Flame are some notable examples of variants of previous APTs.

APTs are generally customized exploits with an explicit mission. They are designed to penetrate a specifically-targeted environment and remain undetected until they can carry out their task; often data exfiltration to an unauthorized receiver.

After an APT has carried out its initial mission, a well-coded APT may be configured to stay hidden and persist in the environment until re-tasked with a new mission.

Referring now to FIG. 1, most APTs and advanced malware are designed around a phased "lifecycle" that allows for them to carry out their mission. A representative lifecycle model may generally include the hacker steps of:

1. Reconnaissance (scanning the network from the outside for useful information and vulnerabilities,
2. Intrusion into the network,
3. Escalation unauthorized hacker privileges,
4. Unauthorized installation of a root kit or kits,
5. Establishment of a hacker command and control structure or "$C^2$",
6. Internal scan of the network for useful information (passwords, network vulnerabilities, proprietary information, etc.,
7. Staging information in the network to be exfiltrated in a subsequent step,
8. Exfiltration,
9. Modification of network data,
10. Obfuscation of hacker presence in the network.

Not all APTs use all of the above steps and the order of the steps is highly dependent on the attack. The one thing in common is that during some phases of the attack, the malicious agent will typically create or modify network traffic.

APT's utilize various tactics across different phases of the attack. Most of these tactics operate within the targeted internal network and thus cannot be detected by any perimeter defensives or even by host-based defenses. Each APT is unique in the way it operates but all APTs and advanced malware are generally designed around the concept of infection retrieving command information, discovering, replicating, carrying out its mission and remaining undetected.

FIG. 1 illustrates general steps that may be taken in an APT attack data exfiltration. An APT begins with a reconnaissance phase performed on the target organization network and/or personnel within the organization. During this phase; the attacker searches for weak links in the external perimeter of the network that can be exploited as entry points into the targeted organization's networks and systems.

This phase may include looking at remote sites and at any partners that could provide access into the targeted network. The reconnaissance phase may never touch the targeted organization's systems but instead may use social networking, evaluating a company's organization through its own website or other publically-available information to identify network entry points.

After the reconnaissance phase, the attacker is ready for the initial intrusion into the network. One of the most common and successful methods of penetrating an organization's network defense is the use of social networking with targeted spear-phishing emails. These are highly-focused emails with some type of attack embedded as part of the email. These emails may be focused on a few individuals that have elevated access within the target organization. Such spear-phishing emails contain a malicious attachment or a malicious link for the receiver to click on, which, if clicked, installs the initial infectious code.

The malicious attachment may be in the form of a document that when opened, installs malicious code. A malicious link could be directed to a site where the attacker has loaded code that exploits vulnerabilities in web browsers when the link is clicked on.

The foregoing examples highlight the fact that a determined attacker has many ways of bypassing an organization's perimeter defenses and infecting its network and systems.

After the attacker has infiltrated the organization's network with the initial intrusion, the attacker's malicious code is configured to establish a connection back to a Command and Control ($C^2$) server that is controlled by the attacker. This permits the attacker to establish a command channel to the malware that is installed on the compromised systems and provides a mechanism to relay commands, retrieve status, and to permit the hacker to install updates to the installed malware. These $C^2$ connections may be short-lived and configured to connect only to a single compromised system within the organization's network that, in turn, relay the command to other compromised systems within the network.

An APT is generally configured to escalate hacker privilege on the compromised system and to update and install utilities needed for its task, to perform discovery by scanning and mapping out the network, to collect information needed to carry out its tasks, and to attempt to spread the infection through "pivoting" within the organization's network. Much activity done within these phases of the attack is performed with minimal, if any, communication outside of the organization's own network. Note that at this point, any perimeter cyber-attack defenses in place on the organization's network are useless detecting the internal-to the network APT activity.

At this point, the attacker may infiltrate the targeted network and spend weeks, months or longer in the network before the mal are is activated to carry out its mission (e.g., data exfiltration). If the mission is to steal/exfiltrate data from the organization or country, then the malware may be configured to begin moving data to a compromised data staging area within the infected system.

After the data is moved to the staging system, it can be packed, obfuscated or encrypted prior to sending it across the perimeter defenses of the network to an external server that is controlled by the attacker. By doing so, it is extremely difficult for any prior art data loss prevention device to detect the exfiltration.

Even after carrying out its mission, the malware may persist in the network. It may be configured to check back with the infected $C^2$ server on an infrequent and irregular timeframe to check for additional updates or to initiate a new mission. While the malware remains fairly quiet within the infected $C^2$ server, it may also be configured to spread to other vulnerable systems.

The ability of APTs to infect and operate within a targeted organization's network with such anonymity make them extremely dangerous in today's networked world.

The current informational assurance ("IA") concept of "Defense-in-Depth" is patterned after the military defense posturing of creating layers of defenses that compel an attacker to expend a large amount of resources to penetrate the defenses. This works well in kinetic warfare but is generally unsustainable in the cyber realm. The concept of Defense-in-Depth; one of layered defenses based on people, processes and technology, may be a sound concept for defensive measures in the kinetic world but the implementation in the cyber arena was adopted long before the risks in the cyber environment were fully understood. Thus Defense-in-Depth as an IA strategy is not a complete solution in today's networked environment. Today's cyber attackers may have the resources of a nation-state behind them and are well-versed in the strategy, technologies, and business practices that are used to define Defense-in-Depth.

Current IA defenses are primarily focused on perimeter defenses. They are designed to guard against malware entering the network or to prevent the initial infection from entering the host system. They rely heavily on recognizing specific data signatures and/or the behavior of specific malware. The idea behind this layered approach is that what is missed at one layer (product) is caught by another. Unfortunately, this approach is not a great challenge to a sophisticated, determined attacker in the modern advanced malware attacks today.

The simple fact is that even though Defense-in-Depth is the predominant security mechanism in place today, successful network attacks are increasing.

The bottom line is that the ability to stop network penetrations by advanced malware is essentially not presently achievable using known prior art defensive mechanisms.

The idea of "host-based" security control is failing under the onslaught of advanced malware. It has been stated that it takes approximately 150 lines of code to develop a new attack variant but may require a million plus lines of code to defend against that attack. With asymmetry of this magnitude, there is no effective way that current security vendors can develop defense mechanisms to prevent advanced malware from entering targeted networks.

What is needed is a way of addressing the dynamic action of present day malware; a way that looks beyond the initial intrusion and a way to look for its signs across all phases of the advanced malware lifecycle. To detect the interworking of advanced malware and APTs, what is needed is a way to monitor traffic within the organization's internal network for forensic data associated with a malware infection.

It is known that even though malware cannot be stopped at the perimeter, if it is resident within the network, it must communicate over and within that network. Advanced malware has evolved to be even more dependent on the underlying network for control, propagation, and payload functionality.

By providing the instant invention that looks beyond specific malware and instead looks for malicious activity that maps to the various phases of an attack, the invention is thus capable of detecting malware before it can carry out its mission. By analyzing the potentially malicious traffic within a network, a host that is generating the malicious activity can quickly be identified and isolated.

To carry out near real-time, in-depth malware detection, a challenge exists in that multiple events must be correlated across time, frequency and lifecycle phases in order to effectively determine if and in what manner a host is infected.

Today's advanced malware and APTs generally hide within normal network traffic but still must utilize the network to carry out their mission. By utilizing a "forensics approach" to monitoring internal network traffic, when malware uses the network, it provides "indicators" or "footprints" that are recognized by the invention and that allow the malware to be detected.

To address the above need, the device and method of the invention is comprised of a set of distributed network-based sensors that feed a centralize analytics engine that correlates network and host event data that is identified by and across the sensors to detect malicious activity on a monitored network. When malicious activity is detected by the invention, it traces the activity back to the host or hosts responsible for the activity.

The invention focuses on detecting advanced malware and APTs by examining traffic deep in the core of an organization's internal network and provides an automated level of network forensic analytics that has is not known in the prior art.

The invention uses high-speed sensor technology, i.e., at 10 Gbit line rates and above, to monitor an organization's network traffic crossing the core network. The sensor elements or sensor control points of the invention look for possible low-level suspicious traffic and statistical data and send notifications to a higher-level analytics engine that correlates these notifications to identify and flag possible malicious events. These events are used to make decisions as to whether the detected activities are malicious.

Based on the results of the decisions, a network operator is notified via an alarm and supporting forensic network data is provided to illustrate a trail as to how the decisions were made. Through this advanced detection and analytics mechanism, the invention also identifies the host(s) that is producing the malicious activity.

Accordingly, a method and device of the invention is provided in the form of an appliance-based network sensor system in one or more "bump-in-the-wire" positions as an analytics processing engine providing time-based analytics on multiple sensor inputs configured for storing the results in an event data storage repository.

BRIEF SUMMARY OF THE INVENTION

The method and invention are directed toward detecting malicious activity within a network such as behind the firewall of the network rather than as it crosses the network perimeter as prior art malware devices and methods are focused on.

The invention is configured to provide security visibility and threat detection "inside" a corporate or other network and may be deployed in one of more locations such is inside the firewall of a computer network, between a data center and the remainder of the network, on a trunk port leading into the core network, on a predetermined segment of a critical user network segment, for protecting key network infrastructure segments e.g., Microsoft AD & Domain Controller, at ingress segments for external private connections or in non-intrusive network positions or any combination thereof.

A fundamental concept of the invention is the detection of potentially anomalous conditions on a per-host basis violation or deviation from an expected "norm" that is made by that host, within the network and behind perimeter-based security devices (e.g., a firewall). All threats are reported in the context of a host or hosts. A host may, for instance, be a client workstation or a server (e.g., FTP server) on a network.

The invention is roc used on detection of threats through unexpected abnormal network behavior detection, short term detection of anomalous activities generating near real-time notifications, analysis of long-term information triggered by the near real-time notifications, and long-term archival of detailed flow-based information in near real-time.

The structure and function of the invention serve to identify near real-time observations of application usage violations which may include banned application communications of a given type between hosts, application communication on a banned port, or banned file types being copied between hosts.

Further, the invention identifies real-time flow usage violations, for example and not by limitation, illegal flow types on a network, flows between illegal source and destinations, flows between abnormal sources and destinations, tunnel detection, and illegal encryption usage with IP protocol usage violations in the form of ARP protocol violations, ICMP protocol violations and DNS protocol usage violations.

In a preferred embodiment, the invention is capable of the above by taking advantage of a novel inference rules engine such as a non-sequential inference rules engine or Rete algorithm-based set of network ode engines that function in cooperation with a set of reconfigurable network data sensors (also referred to as sensor elements or sensor control points ("SCP")) and is thus able to categorize threats by technology, protocol or device type such as by data associated with:

1. HTTP—Improper application usage between hosts or banned file types being copied between hosts,
2. RDP—improper application usage between hosts,
3. DNS—Improper protocol usage,
4. SSH—Improper application usage between hosts,
5. SCP—Improper application usage between hosts,
6. FTP—Improper application usage between hosts or banned file types being copied between hosts,
7. SMTP—Improper application usage between hosts, improper port usage, or banned file types being copied between hosts,
8. IRC—Improper application usage between hosts,
9. DHCP,
10. 802.1Q,
11. LDAP,
12. HOST to MAC,
13. HOST to IP,
14. Device fingerprinting.

The invention further detects the establishment of the presence of malware in a network, i.e., privilege escalation attempts, and acts as a mechanism to detect command and control and additional malware downloads, malware exploration and pivoting. The device may be configured for and is capable of detecting network scans and sweeps and connections with peers within the network, abnormal data movement between network peers, data staging, abnormal data movement between network peers (may indicate staging) and actual data exfiltration events.

Upon the detection of a predetermined abnormal network event, an alarm and log of the event is initiated by the system and the capture and storage of packets that make up the event is performed.

In a first aspect of the invention, a method for identifying an anomalous behavior in a network of host computing elements is provide comprising the steps of providing 1-n network sensors or sensor elements in a computer network and in data communication therewith. At least one of the network sensors is configured to output as sensor notification upon the satisfaction of a predetermined set of network data conditions. The method further comprises outputting the 1-n sensor notifications to an anomalous detection rule engine that is configured to execute a one or more algorithms that are configured for the deterministic detection of an anomalous behavior in the network based on the notifications. The method further comprises executing the one or more algorithms and outputting an alarm signal upon the detection of the anomalous behavior which may include analyzing and correlating the notifications in one or more electronic processing elements.

In a further aspect of the invention, an input to the anomalous detection rule engine is comprised of an alert generated by the anomalous detection ride engine used as a feedback input to the anomalous detection rule engine.

In yet a further aspect of the invention, at least one of the 1-n sensors is located within the network behind as firewall element of the network.

In yet a further aspect of the invention, an input to the anomalous detection rule engine is comprised of a host information element and a notification from the 1-n in the network.

In yet a further aspect of the invention, an input to the anomalous detection rule engine is generated as the result of an output to a correlator configured for the processing of host and flow statistics from the 1-n sensors.

In yet a further aspect of the invention, an input to the anomalous detection rule engine is selected from the group consisting of a sensor notification and a host type.

In yet a further aspect of the invention, an output from the anomalous detection rule engine is selected from the group consisting of a host alert, a potential alarm and a potential alert from a correlator, In yet a further aspect of the invention, the method further comprises the step of providing a correlator input selected from the group consisting of a notification, a host statistic and a host alert.

In yet a further aspect of the invention, the method further comprises the step of providing a correlator output comprising a correlator notification.

In yet a further aspect of the invention, a method for identifying an anomalous behavior in a network of host computing elements is disclosed comprising the steps of providing 1-n network sensors in a computer network and in data communication therewith, each network sensor configured to output a sensor notification upon the satisfaction of a predetermined set of network data conditions, outputting the 1-n sensor notifications to 1-n Rete net-based rule engines configured to execute one or more Rete algorithms configured for the deterministic detection of anomalous behavior in the network based on the notifications, executing the one or more Rete algorithms, and, outputting an alarm signal upon the detection of the anomalous behavior.

In yet a further aspect of the invention, a method for identifying an anomalous behavior in a network of host computing elements using a multi-tiered analytics rule engine is disclosed comprising the steps of providing 1-n network sensors in a computer network and in data communication therewith, each network sensor configured to output a sensor notification to each of a first tier rule engine and a second tier rule engine upon the satisfaction of a predetermined set of sensor network data conditions, the first tier rule engine configured to output one or more alert events to the second tier rule engine upon identifying a predetermined set of notifications, and, the second tier rule engine configured to output an alarm event to a user upon identifying a predetermined combination of alarms and notifications.

In yet a further aspect of the invention, a method for identifying an anomalous behavior in a network of host computing elements using a multi-tiered analytics rule engine is disclosed comprising the steps of providing 1-n network sensors in a computer network and in data communication therewith, each network sensor configured to output a sensor notification to each of a first tier rule engine and a second tier rule engine upon the satisfaction of a predetermined set of sensor network data conditions, a subset of the sensor network data conditions of which comprise a predetermined host condition, the first tier rule engine configured to output one or more alert events to the second tier rule engine upon identifying a predetermined set of notifications, the second tier rule engine configured to output an alarm event to a user upon identifying a predetermined combination of alarms and notifications, and, wherein the 1-n sensors are configured to concurrently output summary host data comprising flow data upon identification of a notification resulting from the host condition.

In yet a further aspect of the invention, a device for identifying an anomalous behavior in a network of host computing elements comprising 1-n network sensors configured to output a sensor notification upon the satisfaction of a predetermined set of network data conditions and to output summary data and special packet data, and, 1-n Rete net-based rule engines that are configured to execute a one or more Rete algorithms that are configured for the deterministic detection of anomalous behavior in the network based on the notifications.

Special packet data is defined herein as any set of user-defined packet data information or state used for analysis of a condition in a host or network.

In a yet further aspect of the invention, the device further comprises a correlation engine configured to receive summary data and special packet data from the 1-n sensors.

In yet a further aspect of the invention, a device for identifying an anomalous behavior in a network of host computing elements using a multi-tiered analytics rule engine is disclosed comprising 1-n network sensors, a first tier rule engine, a second tier rule engine, the 1-n network sensors configured to output a sensor notification to each of the first tier rule engine and a second tier rule engine upon the satisfaction of a predetermined set of sensor network data conditions, the first tier rule engine further configured to output one or more alert events to the second tier rule engine upon identifying a predetermined set of notifications, and, the second tier rule engine configure to output an alarm event to a user upon identifying a predetermined combination of alarms and notifications.

In any of the above aspects of the invention, a Rete net rule engine may be provided and configured host-type information as a Rete net role engine input.

In any of the above aspects of the invention, a Rete net rule engine may be provided and configured to receive outputs from a correlator that processes host and flow statistics.

In any of the above aspects of the invention, a Rete net rule engine may be provided and configured to receive notifications, host type or correlator-generated notifications or any combination thereof as a Rete net rule engine input.

In any of the above aspects of the invention, a Rete net rule engine may be provided and configured produce a host alert, potential alarm, an alert to a correlator notifications or any combination thereof as a Rete net rule engine output.

In any of the above aspects of the invention, a correlator may be provided and configured for receiving a notification, a host statistic, a flow statistic, a host alert or any combination thereof as a correlator input.

In any of the above aspects of the invention, a correlator may be provided and configured for producing a correlator-generated notification as a correlator output.

These and various additional aspects, embodiments and advantages of the present invention will become immediately apparent to those of ordinary skill in the art upon review of the Detailed Description and any claims to follow.

While the claimed apparatus and method herein has or will be described for the sake of grammatical fluidity with functional explanations, it is to be understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112, are to be accorded full statutory equivalents under 35 USC 112.

The invention and its various embodiments can now be better understood by turning to the following detailed description of the preferred embodiments which are presented as illustrated examples of the invention defined in the claims.

It is expressly understood that the invention as defined by the claims may be broader than the illustrated embodiments described below.

DETAILED DESCRIPTION OF THE INVENTION

Turning now to the figures, applicants disclose a method and device comprised of one or a distributed set of computer network-based sensor elements or sensor control points operating in cooperation with a centralized analytics and correlation engine that cooperate to collect and correlate events sensed across the sensors to detect malicious activity on a monitored network. The method and device may comprise a Rete net-based or a multi-tiered rule set in an analytics correlation system. When malicious activity is detected upon the satisfaction of a predetermined set of rules or conditions, the invention traces the activity to a host or hosts in the network responsible for the activity for further action by a user.

Certain terms used in the specification herein have a defined meaning as follows:

"Notification" is defined as the output of a sensor element and an associated predetermined value, level or weight assigned by the user and based on the satisfaction of a predetermined set of rules or conditions.

"Host Alert" is defined as an indication of detection of activity indicative of command and control malware propagation in the monitored network.

"Potential Alarm" is defined as evidence that an anomalous or malicious behavior has been detected in the monitored network.

"Alarm" is defined as a Potential Alarm that has not been filtered out by a user setting.

"Flow Statistics" are defined as monitored network statistics that contain information about one or more processed data flows in the monitored network, which may include, without limitation, source ID, destination ID, protocol, timestamp, or packet information).

"Host Statistics" are defined as statistics stored on a per-monitored host basis, including statistics relating to applications, subnets communicated with and byte counts of transmitted and received data.

In the invention, potential alarms may be compared against a user-defined database to determine whether the same alarm/host combination has been seen previously and "cleared" by the operator.

Figure 1:
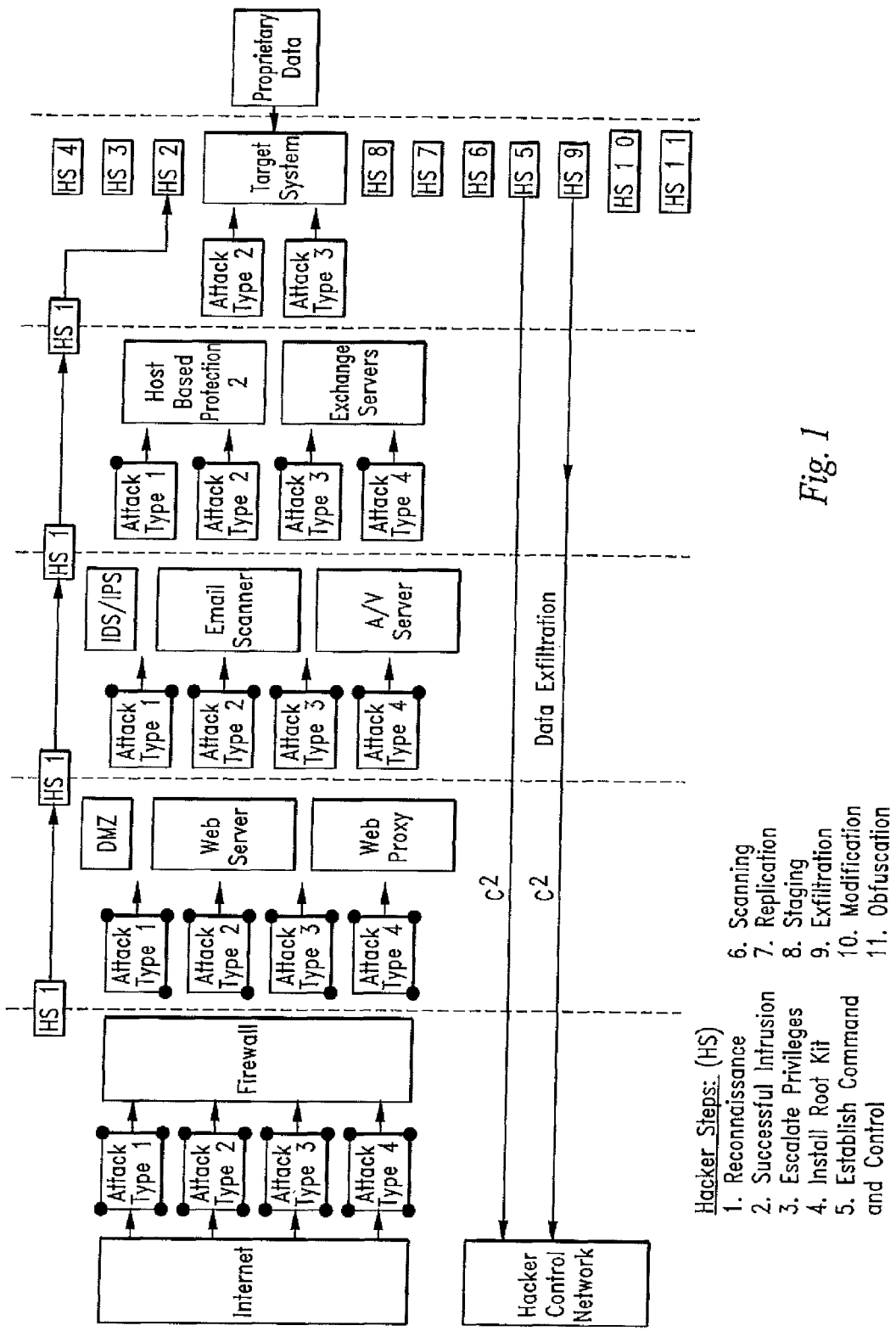
FIG. 1 illustrates an exemplar set of advance persistent threat (APT) hacker steps (HS) taken in a network to permit the unauthorized exfiltration of data and the respective level of penetration therein.
Figure 2:
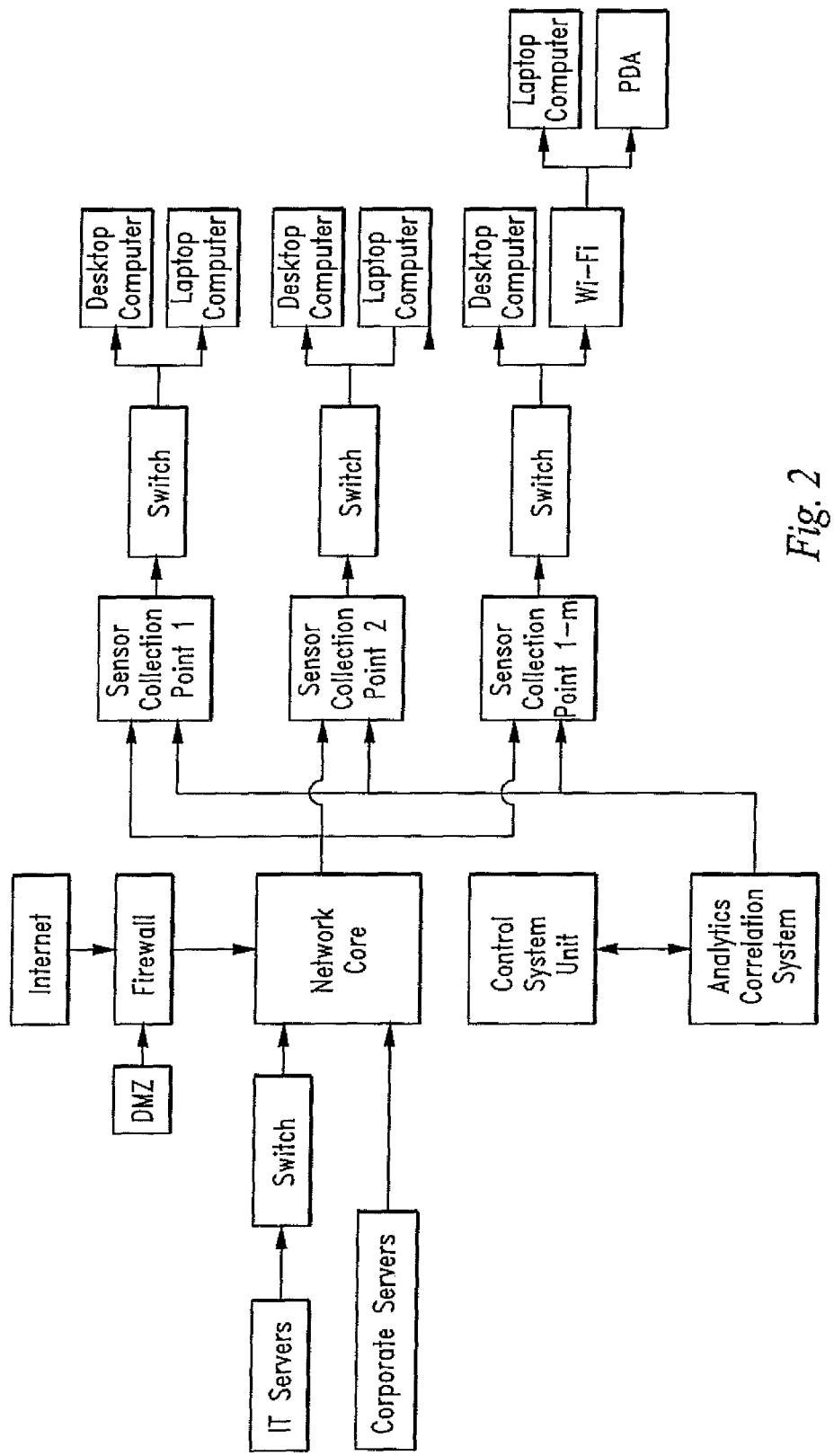
FIG. 2 illustrates a block diagram of a computer network and the CSU (Control System Unit), ACS (Analytics Correlation System) and a plurality of sensor elements installed in a computer network and a data flow within a network respectively.

With respect to FIG. 2, a block diagram of a preferred embodiment of the invention in a monitored computer network is depicted. FIG. 2 depicts data flow of the computer network configuration that may occur in a monitored computer network having the system of the invention installed therein.

At a very general level, the device of the invention is comprised of three major subsystems.

The first major subsystem is an analytics correlation system ("ACS") configured to provide alarm generation and summary network data correlation, collection and stringing of summary data from any identified and "tagged" "suspect" host system (i.e., identified by the invention as possibly being the subject of a malicious attack).

The ACS is configured for providing a rules-based analytics framework for receiving events from the system sensor collection points, referred to as sensor elements or "SCP's".

The second major subsystem comprises of one or more passive smart sensor elements or SCPs configured for the sensing, collection and outputting of summary network data within the network.

The third major subsystem is the control system unit or "CSU" that is configured for the control, interface and configuration of the system devices of the invention.

The sensor elements may be configured to perform packet/flow processing for performing flow statistics, protocol analysis and meta-data extraction or any combination thereof of sensed network data. The sensor elements perform system notification generation preferably using user-configurable rule sets configured for identifying predetermined policy violations, illegal protocol usages, file type and data movement violations and host-related flow summary data.

The control system unit is configured to function as an analytics interface and to provide and relay notifications in the system as well as to receive alarm information from the analytic correlation system.

The analytic correlation system comprise a correlator engine and performs correlation of network data detected and sent from the SCPs in a host-oriented configuration, and for the correlation of time-based network traffic statistics data.

The ACS is configured to provide indexed, correlated and time-based storage of received data and processes the network statistics based upon the outputting of predefined notifications or sets of notifications.

Anomalous network statistics are detected by the correlator engine and generate notifications that are processed, in a preferred embodiment, by a Rete-based inference or rule engine or user-defined analytics rule engine.

Network information collected by the one or more sensor elements may be correlated, for instance, by host type, network topology, subnet membership, permissible or non-permissible behavior, sequence of events (notifications), timing of events (notifications), or user-defined weightings of any or all of the above correlation factors The device of the invention may be comprised of one or a plurality 1-n sensor collection points that may comprise 1-n sensor elements. The sensor elements may be in the form of configurable electronic processing elements such an Octeon processor available from Cavium, Inc.

The sensor elements are preferably software-configurable in the form of a plurality of sensor elements; each configured to separately sense or identify a predefined aspect or characteristic of the sensed network data packet or flow or both.

For instance and by way of example and not by limitation, a sensor element may be configured to sense a predetermined network data characteristic such as a predetermined header or packet data characteristic, e.g., content, destination, source, variable or state.

In a preferred embodiment, a sensor element may be configured as an application detection sensor that is configured to determine normal traffic or usage patterns between two hosts in network application transactions. Once normal traffic or usage patterns have been established, the sensor may be configured to look for variations in the pre-established traffic or usage pattern. The pre-established traffic or usage pattern may be a pre-configured setting that is shipped with the device of the invention, or updated, or "learned" by the device at the customer network over a predetermined period of time.

In an alternative preferred embodiment, a sensor element may be configured to receive and store a list of approved ports for a network applications based on a predetermined downloaded configuration. In this manner, if a non-standard port is used with a pre-identified application, the sensor may be configured to generate a notification within the device.

In an alternative preferred embodiment, a sensor element may be configured to receive and store a list of subnets and an associated list of networking applications that are not permitted by the user on a subnet and further configured to generate a user notification if an unapproved application is detected. In this embodiment, the information collected by the sensor element is collected and stored as part of a host table by the system.

The collected and stored in information is preferably periodically sent the analytic correlation system or "ACS" of the invention using a Netflow record format. The time interval of transmitting the collected information to the ACS is preferably configurable by the user.

In an alternative preferred embodiment, a sensor element may be configured to identify L7 application types wherein each of the L7 application types has its own numeric identifier that uniquely represents each type, which, by way of example and not by limitation, may include pear-to-per communication, BitTorrent, Gnutella, Winny, eDonkey, remote desktop control/terminal protocols, Microsoft RDP, X224, VNC, SSH communication, telnet communication, file transfer protocols or FTP, SFTP, SCP, proxy services, Hopster proxy. Anonymizer services, TOR Anonymizer, file system network share usage, CIFS-Microsoft Common Internet File System aka SMB-Samba NFS, instant messaging protocols, ICQ, IRC, AIM, Google Talk, Yahoo Messenger, Meebo Web IM, Skype authorization and peer-to-peer traffic, Microsoft Live Messenger, XMPP, email transfer, IMAP, MAPI, POP3, SMTP, social media site usage, Facebook, LinkedIn, MySpace or similar protocols or any combination thereof.

In an alternative preferred embodiment, a sensor element may be configured to sense a set of predefined host-based statistics. Host-based statistics are collected and stored in a host table and may include information such as but not limited to local host ID, destination subnet, TCP/IP address, application identifier, usage count of how many times the application was seen or data volume of how much data was both sent and received between the local host and the subnet or any combinations thereof.

If two internal hosts are involved in the use of an application protocol, both entries in the host table are preferably updated with the appropriate statistics by the system.

In an alternative preferred embodiment, a sensor element may be configured to sense configuration information, including, by way of example and not by limitation, host statistic push frequency-integer values that indicate how often the SCP push gathered host statistics to the ACS, a list of enabled applications, a list of permitted ports by L7 application, or a list of disallowed L7 applications by subnet or any combination thereof.

In an alternative preferred embodiment, a sensor element may be configured to sense file transfer metadata extraction and detection to extract metadata about a predetermined set of protocols in addition to the application identification that is discussed above.

Metadata information collected by a sensor element may be collected and used to generate a system notification or sent as a statistic back to the ACS. The sensor element may be configured to extract file name, file type and file size information or any combination of each for each of a predetermined set of protocols.

Each protocol is preferably provided as a list of file names, file types and file size thresholds that are compared against a predetermined table or database of values. In this manner, if any match or size violation occurs, the sensor element generates a notification to the system. The file names, types and volumes are preferably capable of being updated in a configuration update by the system.

In an alternative preferred embodiment, a sensor element may be configured to sense file type determination to determine the type of file being transferred within a network and identify it. Such identification is useful in detecting certain malicious "bot" activity inside a network. For example, Windows executable files, PDF files, etc. are all binary files that can be indicative of the spreading of malicious code in a network.

In an alternative preferred embodiment, a sensor element may be configured to sense data traffic volume to determine normal usage patterns between a host and a subnet for the volume of traffic transported. Once normal usage patterns are established by the user, the sensor element in this embodiment is configured sense variations in the data usage patterns and for inconsistencies between type of host and the amount of traffic seen, especially the difference between what is sent vs. received.

An SCP of the invention may also be configured to sense certain types of communications that are not permitted on the network. For example, traffic between predetermined two client hosts may be configured so as to never be permitted by the user.

In an alternative preferred embodiment, a sensor element may be configured to sense stateful HTTP transactions to extract whether the HTTP protocol is being used in a method that is not considered standard browser usage and to detect when the HTTP protocol is being used in a non-standard way.

In an alternative preferred embodiment, a sensor element or sensor collection point of the invention may be configured to sense DNS misuse to determine if the DNS protocol is being used as a command and control or an exfiltration mechanism by a hacker in an APT.

In an alternative preferred embodiment, a sensor element may be configured to sense ICMP misuse to determine if the ICMP protocol is being used as either a command and control or an exfiltration mechanism. For instance, ICMP abnormalities may be tracked and a notification generated if any are identified.

In an alternative preferred embodiment, a sensor element may be configured to sense ARP misusage to determine if the ARP protocol is being used to overload a switch in the monitored network in conjunction with a Man-in-the-Middle attack. In this embodiment, the sensor element is configured to track ARP requests and responses and generate a notification upon the satisfaction of a set of predetermined conditions.

In an alternative preferred embodiment, a sensor element may be configured to sense IP connection scanning attempts to determine if scanning is being attempted on either a TCP or UDP network. In this embodiment, the sensor element tracks and collects information on both inbound and outbound failed connection attempts and ICMP destination unreachable error packets as a way of detecting port scanning attempts by a hacker.

In an alternative preferred embodiment, a sensor element may be configured to sense and perform IP header analysis to determine if an internal host is communicating with external hosts which are not being tracked by the system, in a Dark IP space or connecting either to or from a list of configured ports. In this embodiment, the sensor element is configured to track both inbound and outbound TCP or UDP requests and to generate a notification under user-specified conditions.

In an alternative preferred embodiment, a sensor element may be configured as a data traffic summary sensor to gather and send a summary record for each completed flow in a network. In this embodiment, the sensor element need not be but can be configured to generate any notifications and may be configured only to send the summary information it gathers to the ACS of the invention.

The invention may be provided to take advantage of a Rete net-based inference engine using a set of Rete algorithms and methods for near-line rate identification of potential malicious activity in a monitored network.

One or more Rete algorithms may be incorporated in the invention to provide a generalized logical description of an implementation of functionality responsible for matching data tuples ("facts") against productions ("rules") in a pattern-matching production system (a category of rule engine). A "production" consists of one or more conditions and a set of actions which may be undertaken for each complete set of facts that match a set of conditions.

Conditions test fact attributes, including fact type specifiers/identifiers. A Rete algorithm generally exhibits the following major characteristics: It reduces or eliminates certain types of redundancy through the use of node sharing thus permitting near-line rate network analysis.

The Rete net embodiment is configured to store partial matches when performing "joins" between different fact types. This, in turn, allows production systems to avoid complete re-evaluation of all facts every time changes are made to the production system's working memory. Instead, the production system needs only to evaluate the changes (deltas) to working memory and thus allows for efficient removal of memory elements when facts are retracted from working memory.

The Rete algorithm may be used to implement matching functionality within the system's pattern-matching engines to exploit a match-resolve-act cycle to support forward chaining and inferencing.

Retes are directed acyclic graphs that represent higher-level rule sets. They are generally represented at run-time using a network of in-memory objects. These networks match rule conditions (patterns) to facts (relational data tuples).

Rete networks act as a type of relational query processor, performing projections, selections and joins conditionally on arbitrary numbers of data tuples. Productions (rules) are typically captured and defined by analysts and developers using some high-level rules language. They are collected into rule sets which are then translated, often at run time, into an executable Rete. When facts are "asserted" to working memory, the engine creates working memory elements (WMEs) for each fact. Facts are n-tuples, and may therefore contain an arbitrary number of data items.

Each WME may hold an entire n-tuple, or, alternatively, each fact may be represented by a set of WMEs where each WME contains a fixed-length tuple. In this case, tuples are typically triplets (3-tuples). Each WME enters the Rete network at a single root node. The root node passes each WME on to its child nodes, and each WME may then be propagated through the network, possibly being stored in intermediate memories, until it arrives at a terminal node. ("Rete Algorithm"; Wikipedia, 18 Jul. 2012).

The Rete-net analytic configuration of the invention is beneficially "host-centric" with rule sets directed toward the activities of the individual hosts in the network. In this configuration, system rules can be added or removed without starting or stopping the system and thus hosts, subnet membership, notifications and host alerts appear as "facts" in the system and can be added or removed while the system is operating. Further, such a system is scalable using the same rules to process many hosts and taking advantage of the fact Rete-net based systems are easily configured to process thousands of rules and thousands of facts.

Figures 3, 3A:
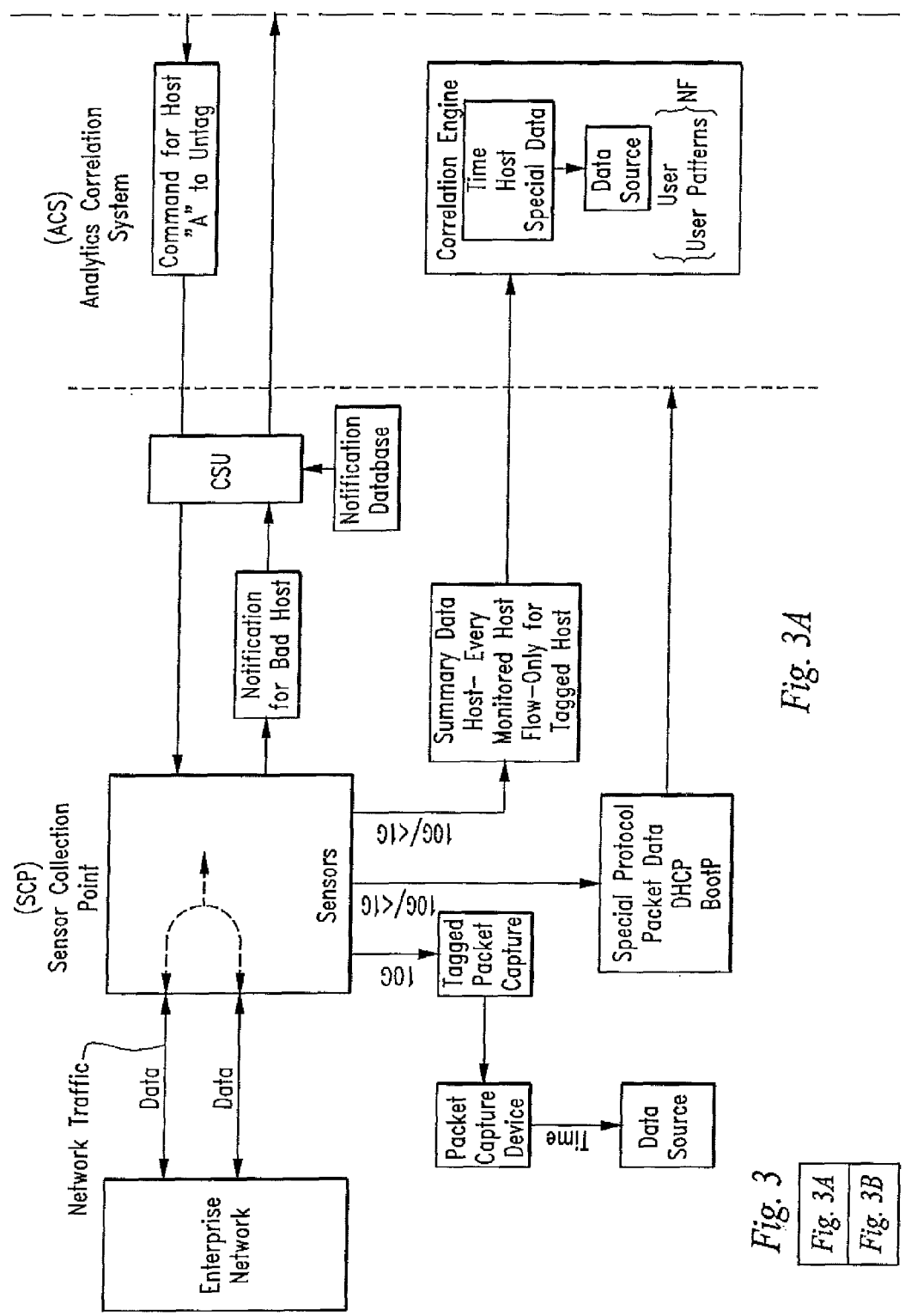
FIGS. 3A and 3B illustrate a block diagram of a preferred embodiment of the invention illustrating major elements.
Figure 3B:
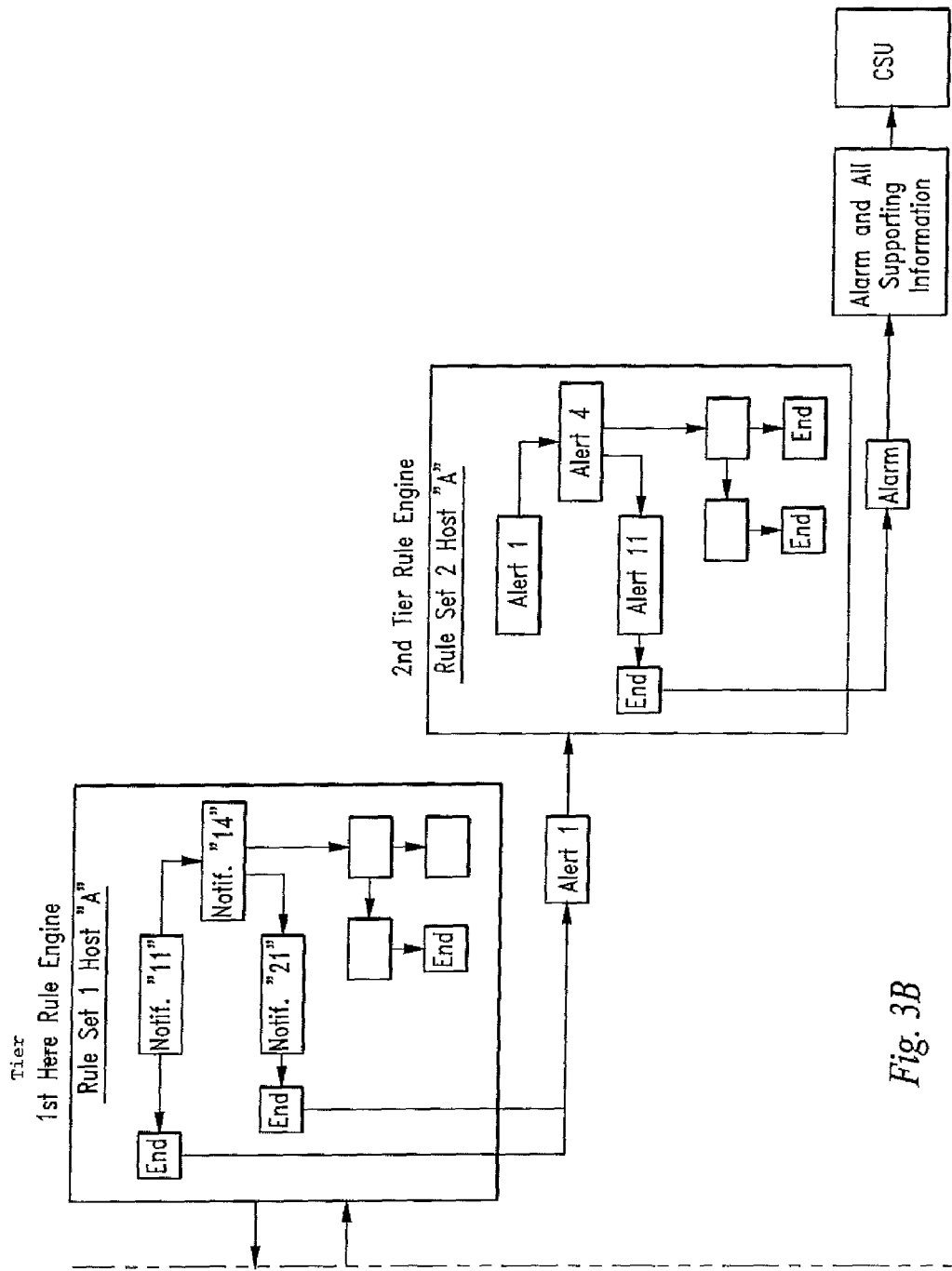

An exemplar configuration of the device of the invention comprising a Rete-net based or multi-tier based rule engine is depicted in FIGS. 3A and 3B.

Figure 4:
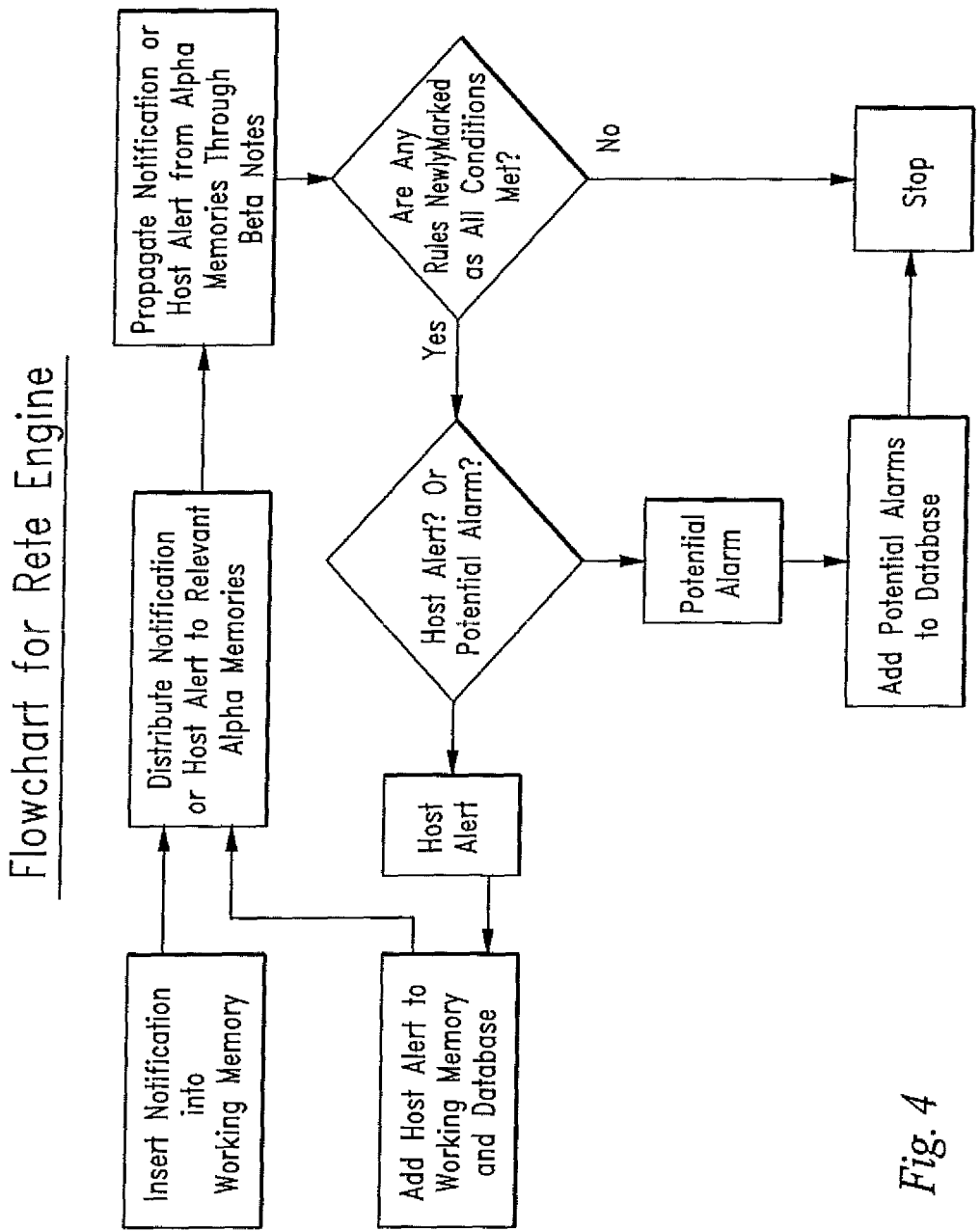
FIG. 4 is a flow chart for a Rete Engine.
Figure 5:
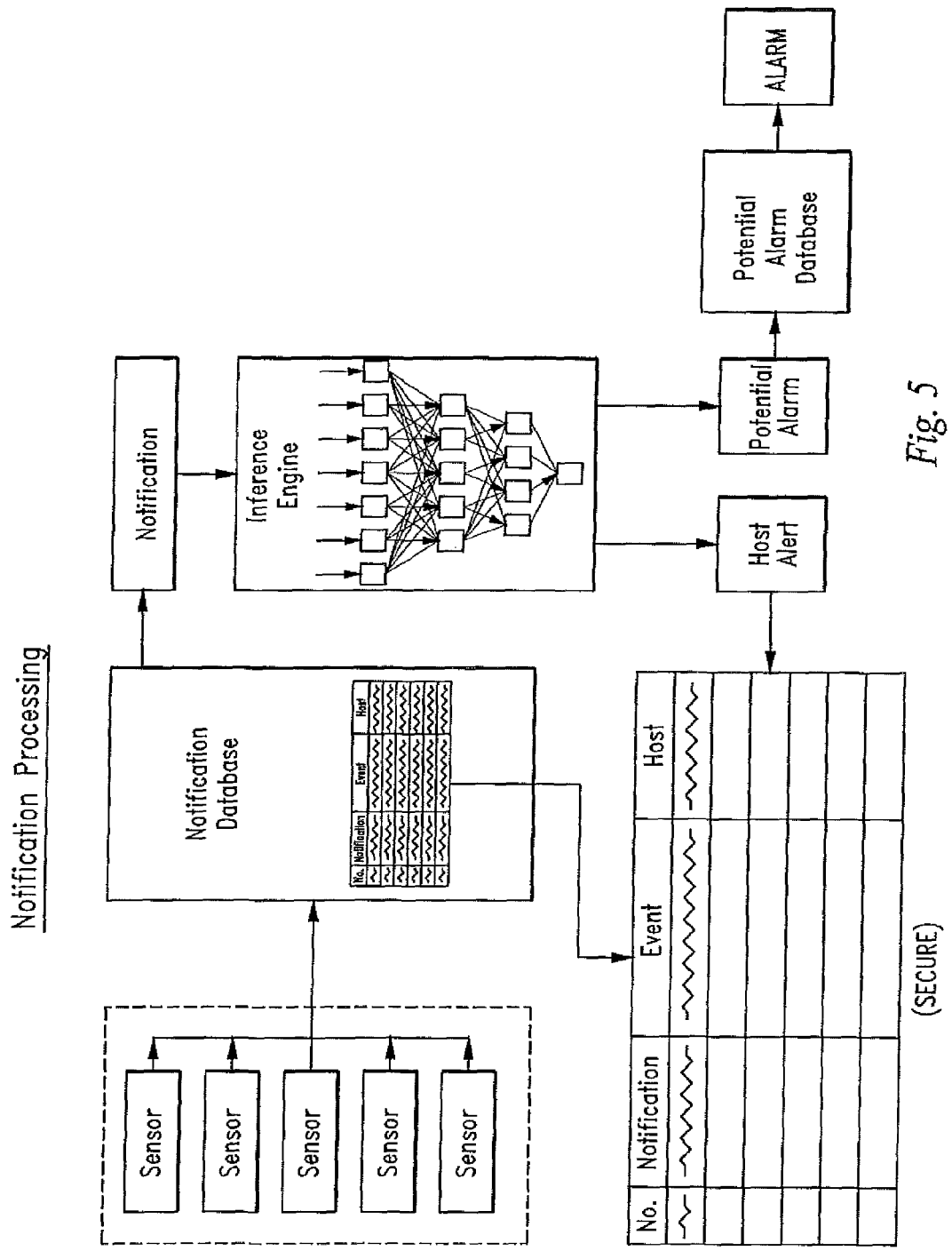
FIG. 5 is a block diagram depiction of a set of sensor outputs received and stored in a notification database having a notification output received by a Rete net rule engine which, in turn, generates a host alert or potential alarm to a database which in turn generates an alarm based on a predetermined set of conditions.

A general flow chart of notification processing from the sensor elements of the invention to the Rete net in the ACS is illustrated in FIG. 4 and FIG. 5.

FIG. 4 is a block diagram depiction of a set of sensor outputs received and stored in a notification database of the invention having a notification output received by a Rete net rule engine of the invention which, in turn, generates a host alert or potential alarm to a database. The database, in turn, generates an alarm to a user based on a predetermined set of network statistics or conditions based upon the flowchart of FIG. 5.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim, Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

We claim:

1. A method for identifying an anomalous behavior in a network of host computing elements comprising the steps of:
   providing 1-n network sensors in a computer network and in data communication therewith, wherein each network sensor is configured to sense or identify a characteristic of a network data packet, a network flow, or both being communicated across the computer network,
   outputting, by at least one of the network sensors, a sensor notification upon the satisfaction of a predetermined set of network data conditions,
   outputting the 1-n sensor notifications to a 1-n Rete net-based rule engine configured to execute a one or more Rete algorithms configured for the deterministic detection of an anomalous behavior in the network based on the notifications,
   executing the one or more Rete algorithms, and
   outputting an alarm signal upon the detection of the anomalous behavior.

2. The method of claim 1 wherein an input to the 1-n Rete net-based rule engine comprises an alert generated by the 1-n Rete net-based rule engine used as a feedback input to a second anomalous detection rule engine.

3. The method of claim 1 wherein at least one of the 1-n sensors is within the computer network behind a network firewall element of the network.

4. The method of claim 1 wherein an input to the 1-n Rete net-based rule engine comprises a host information element and a notification from the 1-n sensors in the network.

5. The method of claim 1 wherein an input to the 1-n Rete net-based rule engine is generated as a result of an output to a correlator configured for the processing of host and flow statistics from the 1-n sensors.

6. The method of claim 1 wherein an input to the 1-n Rete net-based rule engine is selected from the group consisting of a sensor notification and a host type.

7. The method of claim 1 wherein an output from the 1-n Rete net-based rule engine is selected from the group consisting of a host alert, a potential alarm, and a potential alert from a correlator.

8. The method of claim 1 further comprising the step of providing a correlator input selected from the group consisting of a notification, a host statistic, and a host alert.

9. The method of claim 1 further comprising the step of providing a correlator output comprising a correlator notification.

10. A method for identifying an anomalous behavior in a network of host computing elements comprising the steps of:
providing 1-n network sensors in a computer network and in data communication therewith,
outputting, by one or more of the network sensors, a sensor notification upon the satisfaction of a predetermined set of network data conditions,
outputting the 1-n sensor notifications to 1-n Rete net-based engines configured to execute one or more Rete algorithms configured for the deterministic detection of anomalous behavior in the computer network based on the notifications,
executing the one or more Rete algorithms, and
outputting an alarm signal upon the detection of the anomalous behavior.

11. The method of claim 10 wherein at least one of the 1-n sensors is within the network behind a network firewall element in the network.

12. The method of claim 10 wherein an input to the 1-n Rete net-based rule engine is comprised of host information for an individual host.

13. The method of claim 10 wherein an input to the 1-n Rete net-based rule engine is comprised of an output from a correlator configured for the processing of host and flow statistics.

14. The method of claim 10 wherein an input to the 1-n Rete net-based rule engine is selected from the group consisting of a sensor notification, a host type, and a correlator notification.

15. The method of claim 10 wherein an output from the 1-n Rete net-based rule engine is selected from the group consisting of a host alert, a potential alarm, and an alert to a correlator.

16. The method of claim 10 further comprising the step of providing a correlator input selected from the group consisting of a notification, a host statistic, and a host alert.

17. The method of claim 10 further comprising the step of providing a correlator output comprising a correlator notification.

18. A method for identifying an anomalous behavior in a network of host computing elements using a multi-tiered analytics rule engine comprising the steps of:
providing 1-n network sensors in a computer network and in data communication therewith, wherein each network sensor is configured to sense or identify a characteristic of a network data packet, a network flow, or both being communicated across the computer network, each network sensor configured to output a sensor notification to each of a first tier rule engine and a second tier rule engine upon the satisfaction of a predetermined set of sensor network conditions, and wherein at least one of the first tier rule engine or the second tier rule engine comprises a 1-n Rete net-based rule engine configured to execute a one or more Rete algorithms configured for the deterministic detection of an anomalous behavior in the network based on the notifications,
identifying, by the first tier rule engine, a predetermined set of notifications,
outputting one or more alert events to the second tier rule engine in response to identifying the predetermined set of notifications, and
outputting, by the second tier rule engine, an alarm event to a user upon identifying a predetermined combination of alarms and notifications.

19. The method of claim 18 wherein at least one of the 1-n sensors is within the network behind a network firewall element in the network.

20. A method for identifying an anomalous behavior in a network of host computing elements using a multi-tiered analytics rule engine comprising the steps of:
providing 1-n network sensors in a computer network and in data communication therewith, wherein each network sensor is configured to monitor one or more host statistics of a host, wherein the one or more host statistics comprise a statistic related to applications executing on the host, a subnet communicated with by the host, a byte count of transmitted data, a byte count of received data, or any combination thereof, wherein each network sensor is configured to output a sensor notification to each of a first tier rule engine and a second tier rule engine upon the satisfaction of a predetermined set of sensor network conditions, a subset of which comprises a predetermined host condition, and wherein at least one of the first tier rule engine or the second tier rule engine comprises a 1-n Rete net-based rule engine configured to execute a one or more Rete algorithms configured for the deterministic detection of an anomalous behavior in the network based on the notifications,
the first tier rule engine configured to output one or more alert events to the second tier rule engine upon identifying a predetermined set of notifications,
the second tier rule engine configured to output an alarm event to a user upon identifying a predetermined combination of alarms and notifications, and
wherein the 1-n sensors are configured to concurrently output summary host data comprising flow data upon identification of a notification resulting from the host condition.

21. The method of claim 20 wherein at least one of the 1-n sensors is within the network behind a firewall element in the network.

22. A device for identifying an anomalous behavior in a network of host computing elements comprising:
1-n network sensors configured to output a sensor notification upon the satisfaction of a predetermined set of network data conditions and to output summary data and special packet data, and
1-n Rete net-based rule engines that are configured to execute a one or more Rete algorithms that are configured for the deterministic detection of anomalous behavior in the network based on the notifications.

23. The device of claim 22 further comprising a correlation engine configured to receive summary data and special packet data from the 1-n sensors.

24. A device for identifying an anomalous behavior in a network of host computing elements using a multi-tiered analytics rule engine comprising:
1-n network sensors within a computer network,
a first tier rule engine,
a second tier rule engine,
wherein each network sensor of the 1-n network sensors is configured to sense or identify a characteristic of a network data packet, a network flow, or both being communicated across the computer network,
wherein the 1-n network sensors are configured to output a sensor notification to each of a first tier rule engine and a second tier rule engine upon the satisfaction of a predetermined set of sensor network conditions,
wherein at least one of the first tier rule engine or the second tier rule engine comprises a 1-n Rete net-based rule engine configured to execute a one or more Rete algorithms configured for the deterministic detection of an anomalous behavior in the network based on the notifications, wherein the first tier rule engine is further configured to output one or more alert events to the second tier rule engine upon identifying a predetermined set of notifications, and wherein the second tier rule engine is configured to output an alarm event to a user upon identifying a predetermined combination of alarms and notifications.

* * * * *